(12) United States Patent
Dooley et al.

(10) Patent No.: US 7,046,194 B2
(45) Date of Patent: May 16, 2006

(54) METHOD OF DESPREADING GPS SIGNALS

(75) Inventors: Saul R. Dooley, Reigate (GB); Andrew T. Yule, Felbridge (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 22 days.

(21) Appl. No.: 10/067,364

(22) Filed: Feb. 4, 2002

(65) Prior Publication Data

US 2002/0105457 A1    Aug. 8, 2002

(30) Foreign Application Priority Data

Feb. 6, 2001    (GB) ................. 0102881.0

(51) Int. Cl.
*G01S 5/14* (2006.01)
(52) U.S. Cl. ................................. 342/357.15
(58) Field of Classification Search .......... 342/357.15, 342/357.12
See application file for complete search history.

(56) References Cited

U.S. PATENT DOCUMENTS

| | | | | |
|---|---|---|---|---|
| 5,365,450 A | | 11/1994 | Schuchman et al. ........ 364/449 |
| 5,402,347 A | * | 3/1995 | McBurney et al. ......... 701/213 |
| 5,418,538 A | * | 5/1995 | Lau ........................ 342/357.15 |
| 5,420,593 A | | 5/1995 | Niles ........................... 342/357 |
| 5,663,734 A | | 9/1997 | Krasner ....................... 342/357 |
| 5,666,122 A | * | 9/1997 | Carter .................... 342/357.15 |
| 5,841,396 A | | 11/1998 | Krasner ....................... 342/357 |
| 5,874,914 A | | 2/1999 | Krasner ....................... 342/357 |
| 5,917,444 A | * | 6/1999 | Loomis et al. ......... 342/357.12 |
| 6,067,503 A | | 5/2000 | Yakos ......................... 701/213 |
| 6,114,992 A | * | 9/2000 | Underbrink ............ 342/357.15 |
| 6,151,353 A | | 11/2000 | Harrison et al. ............ 375/136 |
| 6,178,195 B1 | * | 1/2001 | Durboraw et al. .......... 375/136 |
| 6,300,899 B1 | * | 10/2001 | King ..................... 342/357.12 |

FOREIGN PATENT DOCUMENTS

EP    0561540 A1    9/1993

OTHER PUBLICATIONS

"FFT Processing of Direct Sequence Spreading Codes using Modern DSP Microprocessors", by Robert G. Davenport, pp. 98–105.

* cited by examiner

*Primary Examiner*—Gregory C. Issing
(74) *Attorney, Agent, or Firm*—Aaron Waxler

(57) ABSTRACT

A method of despreading a plurality of GPS spread spectrum signals received by a GPS receiver (24) is disclosed together with a GPS receiver (24) and a mobile communications device (MS1) (especially a mobile cellular telephone) for the same. The method comprises the steps of acquiring a first GPS signal from the stored samples; obtaining frequency information relating to variations in the frequency of the first acquired signal as measured by the GPS receiver; and using the frequency information to acquire a second GPS signal. The frequency information may be used to acquire the second GPS signal in the course of a single dwell and may also, for a digital GPS receiver, relate to variations in the frequency of the first acquired signal present in stored samples.

16 Claims, 3 Drawing Sheets

METHOD OF DESPREADING GPS SIGNALS

FIELD OF INVENTION

This invention relates to a method of despreading a plurality of GPS spread spectrum signals received by a GPS receiver, and to a GPS receiver and a mobile communications device (especially a mobile cellular telephone) incorporating such a GPS receiver for the same.

BACKGROUND TO INVENTION

It is well known to provide a GPS receiver in which replica GPS satellite pseudorandom noise (PRN) code signals are continuously generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudorange information may be retrieved from which the position of the receiver may be calculated using conventional navigation algorithms.

It is further known to provide a mobile cellular telephone incorporating such a GPS receiver for the purpose of enabling operators of cellular telephone networks to determine the location from which a call is made and, in particular, for an emergency call to the emergency services. Of course for an emergency call, it is desirable for the call location to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver; the data message for up to date satellite almanac and ephemeris data from which Doppler shift for satellites in view can be determined; and the current PRN code phase. With such assistance, it is possible to sweep only a narrowed range of frequencies and code phases in which the target PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

A substantial reduction in the number of code instances that need to be checked enables an increase in the dwell time for each check without significantly affecting the overall time to acquisition. The benefit of this is that an increase in the dwell time increases the probability of acquiring weak GPS signals. For example, for a single code instance or dwell, correlation may occur over a period of 10 ms, equivalent to approximately 10 PRN code repetitions (C/A mode) or over a period of 100 ms consists of 10 incoherently summed individual correlation periods of 10 ms.

OBJECT OF INVENTION

It is an object of the present invention to provide a method of despreading a plurality of GPS spread spectrum signals received by a GPS receiver in which the probability of acquiring weak signals is increased and, in particular but not exclusively, when dwells of extended duration are employed to acquire such weak signals.

SUMMARY OF INVENTION

According to a first aspect of the present invention, such a method is provided comprising the steps of acquiring a first GPS signal; obtaining frequency information relating to variations in the frequency of the first acquired signal as measured by the GPS receiver; and using the frequency information to acquire a second GPS signal.

Such variation would typically be indicative of local oscillator drift and movement of the GPS receiver leading to the variation in measurements made by the GPS receiver. By being aware of and compensating for such sources of error, their detrimental effect on the signal acquisition process can be avoided or at least mitigated, thereby aiding in the acquisition of weak GPS signals. This is especially so when long dwell periods are employed in an attempt to acquire remaining weak signals as such variation may occur and may be compensated for in the course of a single dwell.

Where the GPS receiver is a digital receiver in which the received GPS signals are sampled and stored in a memory, the first GPS signal may be acquired from the stored samples whereby the frequency information relates to variations in the frequency of the first acquired signal as present in the stored samples.

The frequency information may be modified to both offset those variations in frequency due to Doppler shift as observed on the first GPS signal by the GPS receiver in so far as that Doppler shift is attributable to the motion of the GPS satellite from which the first GPS signal originated; and also to compensate for the same with respect to the second signal.

Where this is the case, the Doppler shift may be calculated based on a last known position fix of the GPS receiver or alternatively, where the GPS receiver is incorporated in a mobile communications device adapted to communicate with a nearby communications base station, based on a position fix provided by the communications base station. For example, a position fix corresponds to the location of the communications base station.

According to a second aspect of the present invention, a further such method of despreading a plurality of GPS spread spectrum signals is provided in which, in a digital GPS receiver and instead of using the frequency information to acquire the second GPS signal, a determination is made based on the frequency information of whether to resample the received GPS signals, and in the event that such a determination is made, the received GPS signals are resampled.

BRIEF DESCRIPTION OF DRAWINGS

The present invention will now be described, by way of example only, of an embodiment of a mobile cellular telephone comprising a GPS receiver for use in a cellular telephone network with reference to the accompanying schematic drawings in which:

FIG. 5 shows a flow chart of a preferred embodiment of the present invention.

DETAILED DESCRIPTION

Figure 1:
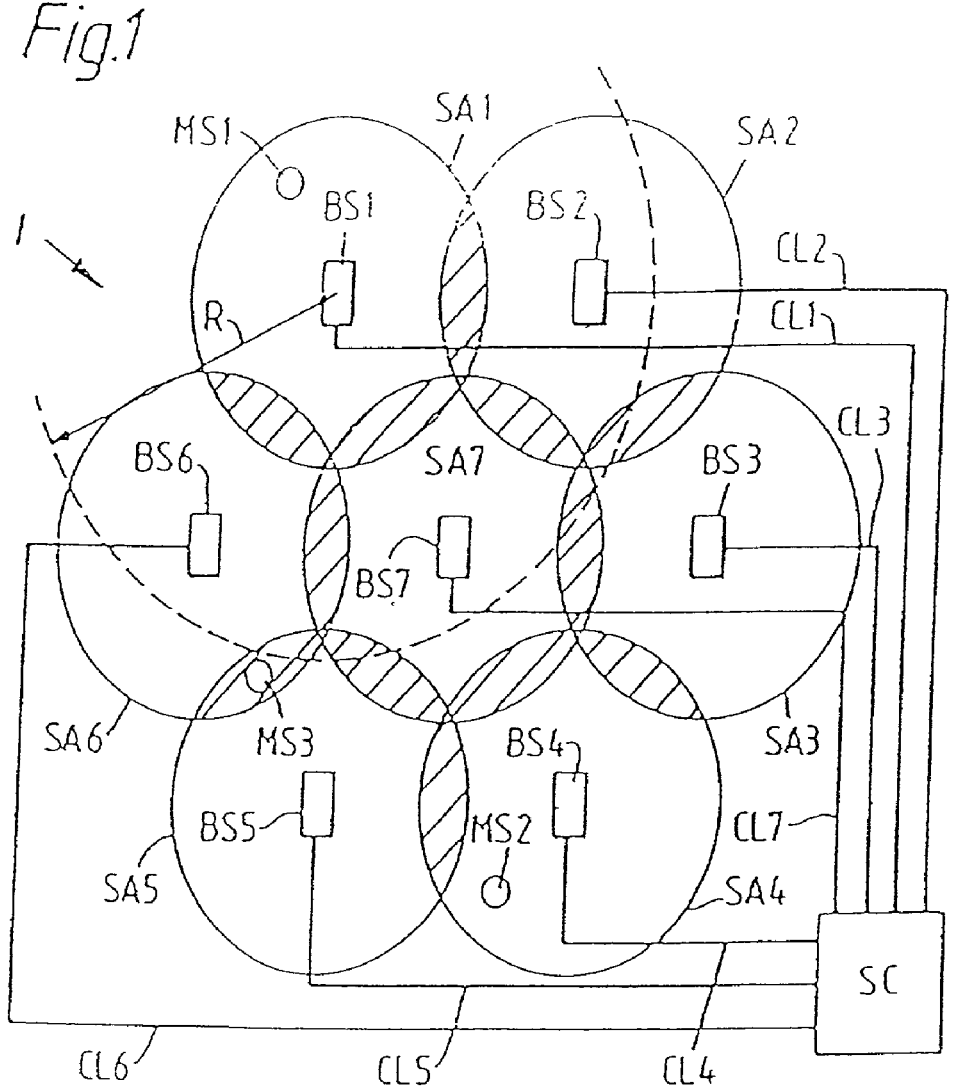
FIG. 1 shows the geographic layout of a cellular telephone network.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
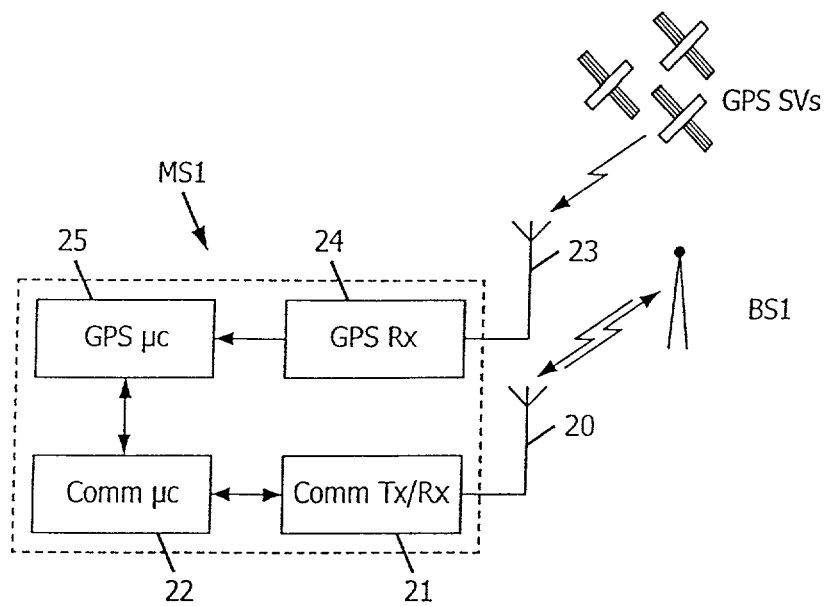
FIG. 2 shows the mobile cellular telephone MS1 of FIG. 1 in greater detail.

Referring to FIG. 2, mobile cellular telephone MS1 is shown in greater detail comprising a communications transmitter (Comm Tx) and receiver (Comm Rx) 21 connected to a communications antenna 20 and controlled by a communications microprocessor (Comm µc) 22 for communication with the base station BS1 with which it is registered. The design and manufacturing of such telephones for two-way communication within a cellular telephone network are well known, those parts which do not form part of the present invention will not be elaborated upon here further.

In addition to the conventional components of a mobile telephone, telephone MS1 further comprises a GPS receiver (GPS Rx) 24 connected to a GPS antenna 23 and controlled by a GPS microprocessor (GPS µc) 25 receiving GPS spread spectrum signals transmitted from orbiting GPS satellites. When operative, the GPS receiver 24 may receive NAVSTAR SPS GPS signal through an antenna 23 and pre-process them, typically by passive bandpass filtering in order to minimize out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 25. The GPS signals may then be are acquired and tracked in any of several digital receiver channels, typically up to 12, for the purpose of deriving pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 25 may be implemented in the form a general purpose microprocessor, optionally common with the communications microprocessor 22, or a microprocessor embedded in a GPS application specific integrated circuit (ASIC).

Figure 3:
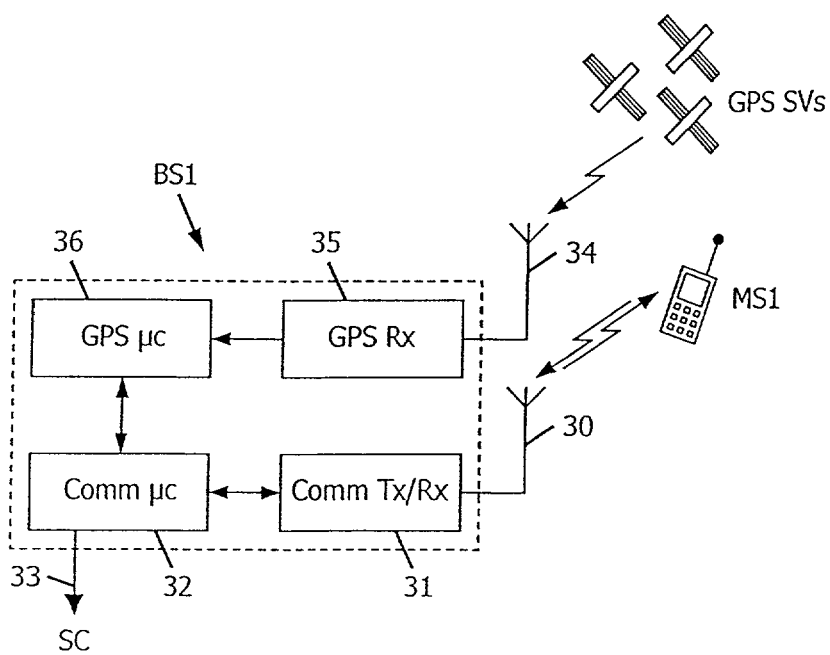
FIG. 3 shows the base station BS1 of FIG. 1 in greater detail.

Cellular telephone network base station BS1 is shown schematically in FIG. 3. In additional to the conventional components of a base station, it further comprises a GPS antenna 34, receiver 35 and microprocessor 36 which are in substantially continual operation whereby the base station is in constant possession of up to date GPS satellite information. This information includes which of the orbiting satellites are presently in view (such satellites are likely to be common to both telephone and associated base station for even macrocells, obscuration aside); the GPS data message containing an up to date almanac and ephemeris data and satellite clock correction data, and the Doppler shift and current code phase of the GPS satellites signals as observed by the base station.

As is known, in the event of the user of the mobile cellular telephone MS1 making an emergency call and under the control of the system controller SC via a two-way communication link CL1, the base station BS1 may provide this information to the telephone whereby it is then only required to sweep a narrowed range of frequencies and code phases in which the target PRN code is known to occupy, ensuring rapid code acquisition and TTFF. A position fix then transmitted back to the base station from the telephone, and then on to the emergency services operator, termed the Public Safety Answer Point (PSAP) in the U.S.

Figure 4:
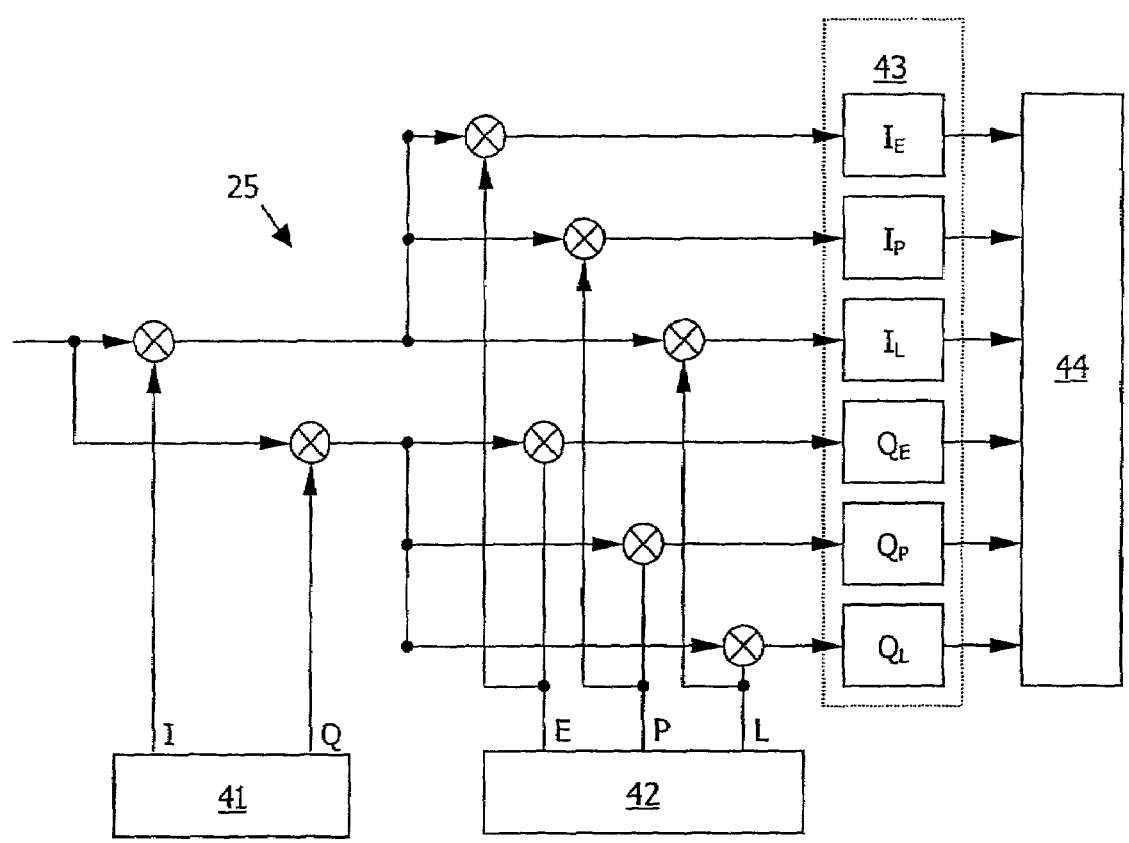
FIG. 4 shows the GPS receiver and processor of the mobile cellular telephone MS1 in greater detail.

Referring to FIG. 4, the GPS microprocessor 25 of the telephone MS1 is shown schematically implementing a pseudorandom noise (PRN) code sweep in which early (E), prompt (P) and late (L) replica codes of satellite PRN codes are continuously generated, and compared to the incoming satellite PRN codes as received by the receiver. In order to retrieve pseudorange information from the signal samples stored in the GPS microprocessor 25, a carrier wave must be removed and this is done by the receiver generating in-phase (I) and quadrature phase (Q) replica carrier wave signals using a carrier wave generator 41. A carrier wave phase lock loop (PLL) is normally employed to accurately replicate the frequency of the received carrier wave. In order to acquire code phase lock, early (E), prompt (P) and late (L) replica codes of the PRN sequences are continuously generated by a code generator 42. The replica codes are then correlated with the I and Q signals to produce three in-phase correlation components ($I_E$, $I_L$, $I_P$) and three quadrature phase correlation components ($Q_E$, $Q_L$, $Q_P$), typically by integration in an integrator 43. A code phase discriminator is calculated as a function of the correlation components and a threshold test applied to the code phase discriminator; a phase match is declared if the code phase discriminator is high and if not, the code generator produces the next series of replicas with a phase shift. A linear phase sweep will eventually result in the incoming PRN code being in phase with that of the locally generated replica and thus code acquisition.

In accordance with the present invention, the GPS processor 25 of mobile telephone MSl may acquire incoming GPS signals in a manner as described in any one of the following examples:

FIG. 5 shows the steps of despreading first and second GPS spread spectrum signals received by a GPS receiver.

EXAMPLE 1

A user of mobile cellular telephone MS1 located inside a building where GPS signal reception is generally poor makes an emergency call to the emergency services (termed "public safety answer point" in the U.S.). Under the control of the system controller SC via a two-way communication link CL1, the base station BS1 provides up to date almanac and ephemeris data, and the Doppler shift of the GPS satellites signals as currently being observed by the base station.

The GPS receiver samples 100ms of GPS signals and then, using the satellite information provided by the base station, the GPS processor 25 employs a conventional early-minus-late correlation architecture in an attempt to acquire the GPS signals. Using a 10ms portion of the 100ms worth of GPS signal sampled, the GPS processor 25 sweeps only a narrowed range of frequencies in which the target PRN code is known to occupy and in doing so manage to acquire two GPS signals having a relatively strong signal-to-noise ratio. This may occur where, for example, the respective GPS satellites are in direct view of the GPS receiver through windows in the building. Then, having completed an unsuccessful sweep for the remaining GPS signals, two further being required to obtain a position fix, the GPS receiver employs a modified acquisition process in which:

(1) Using one of the signals currently acquired, the GPS processor 25 measures the variation in frequency of that signal as observed by the GPS receiver throughout the 100ms GPS signal sample. This may be done by either repetitively acquiring that signal using say several 10ms dwells throughout the 100ms sample sequence; or having acquiring that signal using an initial bins part of the 100ms sample sequence, tracking that signal through the 100ms sample sequence. The variations are typically attributable to local oscillator drift, the reference to which the frequencies are measured by the GPS receiver, and variations in Doppler shift attributable to both handset and satellite movement.

(2) The frequency variation profile may be modified to exclude those frequency variations attributable to Doppler shift caused by the movement of the satellite associated with the acquired signal which can be readily calculated from empheris data provided by the base station or from a previously acquired GPS signal, a position estimate such as one based on a last known position fix or a position fix provided by the communications base station, and a knowledge of GPS time which may be derived from one GPS satellite and a position fix estimate.

(3) To assist in the acquisition of a further GPS signal, the frequency variation profile may be further modified to compensate for expected frequency variations attributable to Doppler shift cause by the movement of the satellite associated with that signal, i.e. the target signal. Again, this may be readily calculated from empheris data provided by the base station or acquired from a GPS signal, a position estimate and knowledge of GPS time.

(4) Using a dwell over the whole 100 ms worth of GPS signal samples, the GPS processor 25 again sweeps only a narrowed range of frequencies in which a target PRN code is known to occupy. This time however, the correlation process employed to acquire that signal is modified in accordance with the frequency variation profile as modified after step (3). That is, the effects of handset movement and local oscillator drift are removed or at least mitigated. This is done in any of the following ways: prior to processing the data in a conventional manner, mixing it with a signal that represents the detected frequency variation; or instead of mixing the data with a fixed frequency offset signal as part of the conventional search mechanism, using a variable frequency signal, adjusted in such a way as to incorporate the measured frequency variation.

EXAMPLE 2

Using a digital GPS receiver and in a similar scenario to that described in example 1 where 2 GPS signals have been readily acquired but at least 2 more are needed: the GPS processor 25 may again measure the variation in frequency of any given signal previously acquired by the GPS receiver throughout the 100 ms GPS signal sample. This time however, where such variations are deemed severe to the extent that it is unlikely that the GPS receiver would be unable to acquire weak signals, the GPS receiver may elect to simply resample the GPS signal and try again.

As an alternative to the early-late correlation method, fast convolution methods and in particular, involving Fast Fourier Transforms (FFTs), may be used in order to acquired the PRN codes. Such convolution methods are described in a paper entitled "FFT processing of direct sequence spreading codes using modern DSP microprocessors" by Robert G Davenport, IEEE 1991 National Aerospace and Electronics Conference NAECON 1991, volume 1, pages 98 to 105, and also in U.S. Pat. No. 5,663,734. The method of the present invention is equally applicable to such convolution methods at least in that any carrier could be stripped from the signal as described above, before the FFT convolution was carried out.

The invention has largely been described in the context of NAVSTAR GPS, the all weather, spaced based navigation system developed and currently operated by the U.S. Department of Defense. However, it will be appreciated that the general underlying principles of GPS are universal and not merely limited to NAVSTAR. Accordingly, GPS is intended to refer to any positioning system comprising a plurality of spread spectrum radio transmitters at different locations and a receiver which determines its location based on the time of arrival of the transmissions of the radio transmitters.

From a reading of the present disclosure, other modifications will be apparent to the skilled person and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A method of despreading first and second GPS spread spectrum signals received by a GPS receiver comprising the steps of:
   acquiring the first GPS signal;
   obtaining frequency information relating to measured variations in the frequency of the first acquired signal as measured by the GPS receiver; and
   in the course of a single dwell, using the frequency information to acquire the second GPS signal.

2. A method according to claim 1 wherein the GPS receiver is a digital GPS receiver and the method further comprises the step of sampling the received GPS signals and storing the samples in a memory, wherein the first GPS signal is acquired from the stored samples, and wherein the frequency information relates to variations in the frequency of the first acquired signal as present in the stored samples.

3. A method according to claim 2 wherein the frequency information is obtained by acquiring the first GPS signal from the stored samples more than once, using different sequences of the stored samples.

4. A method according to claim 2 wherein the frequency information is obtained by tracking the first GPS signal though the stored sample sequence.

5. A method according to claim 2 further comprising the steps of:
based on the frequency information, determining whether to resample the received GPS signals; and
in the event that a determination to resample is made, resampling the received GPS signals,
wherein the second GPS signal is acquired from the resampled GPS signals.

6. A method according to claim 1 wherein the frequency information is modified to offset those variations in frequency due to Doppler shift as observed on the first GPS signal by the GPS receiver in so far as that Doppler shift is attributable to the motion of the GPS satellite from which the first GPS signal originated.

7. A method according to claim 6 wherein the variations in frequency due to Doppler shift are calculated based on a last known position fix of the GPS receiver.

8. A method according to claim 6 wherein the GPS receiver is incorporated in a mobile communications device adapted to communicate with a nearby communications base station; and wherein the variations in frequency due to Doppler shift are calculated based on a position fix provided by the communications base station.

9. A method according to claim 8 wherein the position fix corresponds to the location of the communications base station.

10. A method according to claim 1 wherein the frequency information is modified to compensate for variations in frequency due to Doppler shift as observed on the second GPS signal by the GPS receiver in so far as that Doppler shift is attributable to the motion of the GPS satellite from which the second GPS signal originated.

11. A method according to claim 10 wherein the variations in frequency due to Doppler shift are calculated based on a last known position fix of the GPS receiver.

12. A method according to claim 10 wherein the GPS receiver is incorporated in a mobile communications device adapted to communicate with a nearby communications base station; and wherein the variations in frequency due to Doppler shift are calculated based on a position fix provided by the communications base station.

13. A method according to claim 12 wherein the position fix corresponds to the location of the communications base station.

14. A method according to claim 1 wherein the dwell time employed to acquire the first GPS signal is greater than the dwell time employed to acquire the second GPS signal.

15. A GPS receiver able to despread a first and second GPS spread spectrum signals received by the GPS receiver, comprising:
a processor which acquires the first GPS signal., obtains frequency information relating to measured variations in the frequency of the first acquired signal as measured by the GPS receiver, and in the course of a single dwell, uses the frequency information to acquire the second GPS signal.

16. A mobile telephone comprising;
a GPS receiver able to despread a first and second GPS spread spectrum signals received by the GPS receiver, comprising:
a processor which acquires the first GPS signal, obtains frequency information relating to measured variations in the frequency of the first acquired signal as measured by the GPS receiver, and in the course of a single dwell, uses the frequency information to acquire the second GPS signal.

* * * * *